US010250571B2

(12) United States Patent
Manapragada et al.

(10) Patent No.: US 10,250,571 B2
(45) Date of Patent: Apr. 2, 2019

(54) SYSTEMS AND METHODS FOR OFFLOADING IPSEC PROCESSING TO AN EMBEDDED NETWORKING DEVICE

(71) Applicant: Cavium, LLC, Santa Clara, CA (US)

(72) Inventors: Ram Kumar Manapragada, Hydearabad (IN); Venkat Koppula, Hydearabad (IN); Manojkumar Panicker, Sunnyvale, CA (US)

(73) Assignee: Cavium, LLC, Santa Clara, CA (US)

( * ) Notice: Subject to any disclaimer, the term of this patent is extended or adjusted under 35 U.S.C. 154(b) by 219 days.

(21) Appl. No.: 15/246,440

(22) Filed: Aug. 24, 2016

(65) Prior Publication Data
US 2017/0063808 A1   Mar. 2, 2017

Related U.S. Application Data

(60) Provisional application No. 62/209,222, filed on Aug. 24, 2015.

(51) Int. Cl.
*H04L 29/06* (2006.01)
*H04L 29/08* (2006.01)
*G06F 9/455* (2018.01)

(52) U.S. Cl.
CPC ...... *H04L 63/0428* (2013.01); *H04L 63/0272* (2013.01); *H04L 63/0485* (2013.01); *H04L 67/10* (2013.01); *H04L 67/2804* (2013.01); *G06F 9/455* (2013.01); *H04L 63/164* (2013.01)

(58) Field of Classification Search
CPC ............. H04L 63/0428; H04L 63/0272; H04L 63/0485; H04L 63/164; H04L 67/10; H04L 67/2804; G06F 9/455
See application file for complete search history.

(56) References Cited

U.S. PATENT DOCUMENTS

| 8,990,799 | B1* | 3/2015 | Forecast | G06F 9/45558 718/1 |
| 9,413,783 | B1* | 8/2016 | Keogh | H04L 63/1458 |
| 9,641,435 | B1* | 5/2017 | Sivaramakrishnan | H04L 45/745 |
| 2008/0022094 | A1* | 1/2008 | Gupta | H04L 63/0485 713/165 |
| 2008/0271134 | A1* | 10/2008 | Johnson | H04L 63/02 726/13 |

(Continued)

*Primary Examiner* — Hadi S Armouche
*Assistant Examiner* — Alexander R Lapian

(57) ABSTRACT

A new approach is proposed that contemplates systems and methods to support a mechanism to offload IPSec/IKE processing of virtual machines (VMs) running on a host to an embedded networking device, which serves as a hardware accelerator for the VMs that need to have secured communication with a remote device/server over a network. By utilizing a plurality of its software and hardware features, the embedded networking device is configured to perform all offloaded IPSec operations on data packets transferred between the host and the remote device over the network as required for the secured communication before the data packets can be transmitted over the network. The embedded networking device, in effect, acts as a proxy on behalf of the VMs running on the host to perform the offloaded IPSec operations as well as serving as the network interface for the secured communication between the VMs and the remote device.

27 Claims, 3 Drawing Sheets

(56) References Cited

U.S. PATENT DOCUMENTS

| | | | |
|---|---|---|---|
| 2012/0096269 A1* | 4/2012 | McAlister | H04L 63/061 |
| | | | 713/171 |
| 2016/0021194 A1* | 1/2016 | Prabhakar | H04L 67/143 |
| | | | 709/204 |
| 2017/0264554 A1* | 9/2017 | Contavalli | H04L 47/193 |

* cited by examiner

SYSTEMS AND METHODS FOR OFFLOADING IPSEC PROCESSING TO AN EMBEDDED NETWORKING DEVICE

CROSS-REFERENCE TO RELATED APPLICATIONS

This application claims the benefit of U.S. Provisional Patent Application No. 62/209,222, filed Aug. 24, 2015, and entitled "SYSTEM AND METHOD TO OFFLOAD IPSEC TO A NETWORK INTERFACE CARD," which is incorporated herein in its entirety by reference.

BACKGROUND

Internet Protocol Security (IPSec) is a protocol suite of cryptographic security services commonly used to secure and protect Internet Protocol (IP) communications between a pair of two peers/parties by authenticating and encrypting data packets exchanged between them during a secured communication session. IPSec is an end-to-end security scheme operating in the Internet Layer of the IP Suite. IPSec includes protocols for establishing mutual authentication between the parties at the beginning of the session and negotiation of cryptographic keys to be used during the session. Here, IPSec can be used in protecting data packets exchanged between, for non-limiting examples, a pair of hosts (host-to-host), a pair of security gateways (network-to-network), web services running on hosts and client devices (host-to-client), or between a security gateway and a host (network-to-host).

Internet Key Exchange (IKE or IKE v2) is a protocol used to set up a security association (SA) in the IPSec protocol suite. IKE uses authentication certificates (e.g., X.509) to set up a shared secret for the session between the parties from which cryptographic keys can be derived. In addition, a security policy for every party in the session can be manually maintained. Most IPSec implementations include an IKE daemon that runs in the user space and an IPSec stack in the kernel that processes the actual data packets. The user-space daemon has access to a storage containing configuration information of the session, such as information identifying the IPSec endpoint addresses and ports of the parties, keys and certificates, and the type of IPSec tunnel has been created between the parties. The IPSec stack in the kernel, in turn, intercepts the relevant IP packets exchanged between the parties during the session, and if and where appropriate, performs encryption/decryption operations on the data packets as required.

IPSec and IKE can typically be implemented on a host (e.g., a host that provides web-based services) that initiates the secured communication with a client device using software solutions. Since IPSec and IKE perform network-level peer authentication, data origin authentication, data integrity, data confidentiality (encryption/decryption), and replay protection, implementing IPSec and IKE in software may consume tremendous amount of CPU processing power on the host. It is thus desirable to be able to offload the IPSec and IKE operations to an external hardware accelerator.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
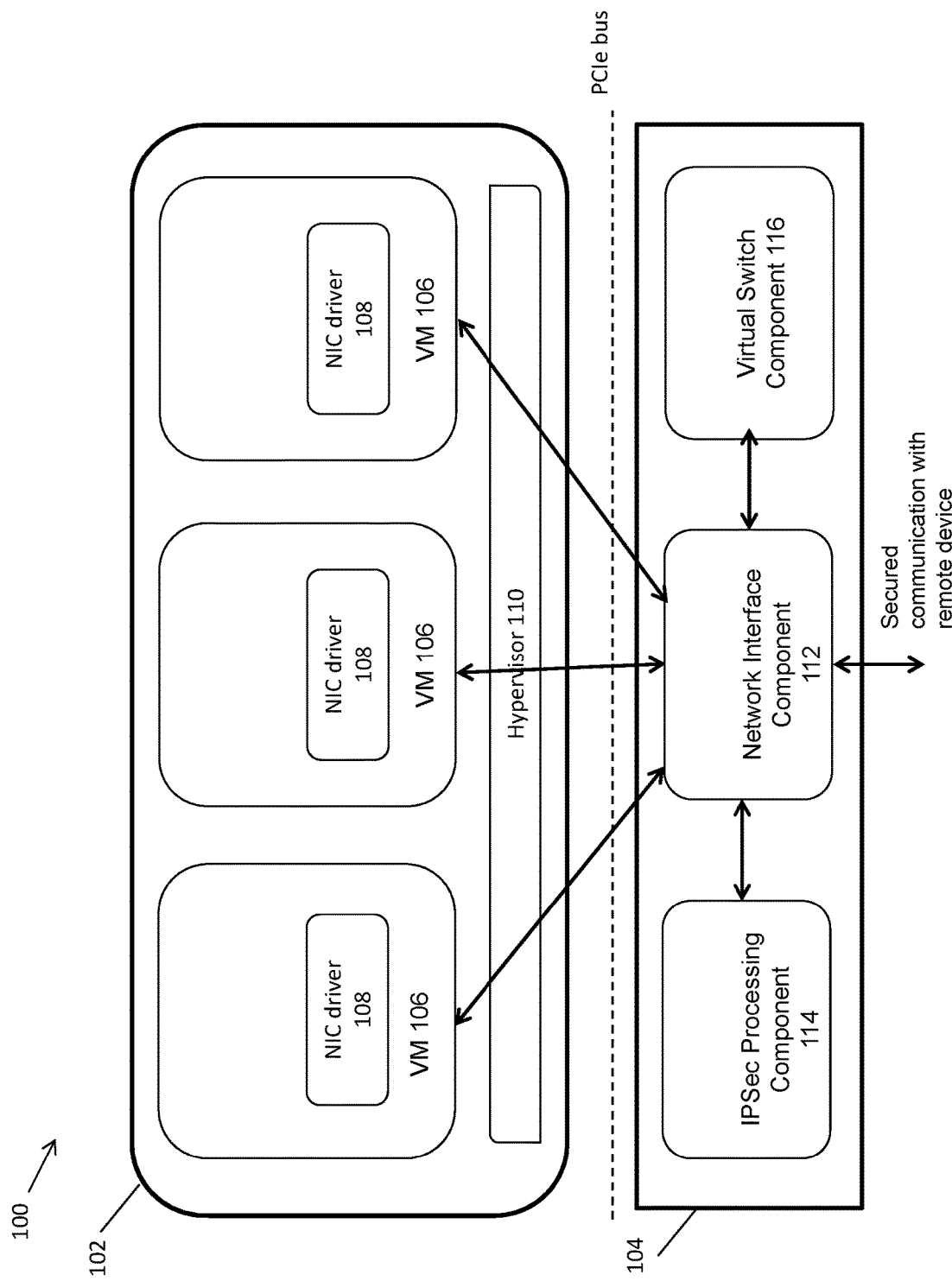
FIG. 1 depicts an example of a diagram of a system configured to support offloading of IPSec operations on network traffic in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support a mechanism to offload IPSec/IKE processing of virtual machines (VMs) running on a host to an embedded networking device, which serves as a hardware accelerator for the VMs that need to have secured communication with a remote device/server over a network. By utilizing a plurality of its software and hardware features, the embedded networking device is configured to perform all offloaded IPSec operations on data packets transferred between the host and the remote device over the network as required for the secured communication before the data packets can be transmitted over the network. The embedded networking device, in effect, acts as a proxy on behalf of the VMs running on the host to perform the offloaded IPSec operations as well as serving as the network interface for the secured communication between the VMs and the remote device. The embedded networking device is also configured to serve as a virtual switch for the VMs and to support both the offloaded IPSec operations and virtual switching functionalities on the embedded networking device.

By offloading the IPSec operations from the VMs to the embedded networking device, the proposed approach achieves hardware acceleration for the offloaded IPSec operations on network traffic between the VMs and the remote device and thus greatly reduces the burden on the host of the VMs in terms of CPU and memory consumption required for performing the IPSec operations. In addition, the interface between the VMs running on the host and the embedded networking device serving as the hardware accelerator conforms to any existing interfaces so that the VMs can benefit from the offload capabilities of the hardware accelerator with little or no change to its software. Furthermore, since the hardware accelerator is acting as the network interface for all network traffic between the host and the remote device over the network, it is capable of handling both network traffic requiring IPSec processing for secured communication as well as standard network traffic that does not require additional IPSec processing.

As referred to hereinafter, the embedded networking device (or hardware accelerator) is a network interface card (NIC), which may include a multi-core network data packet processing engine to support flexible packet processing at various I/O rates (e.g., 10, 25, and 40 Gbps). The virtual switch supported by the NIC can be but is not limited to Open vSwitch (OVS), which is a multilayer software program designed to enable the VMs to communicate with one another while still supporting standard network management interfaces and protocols. In addition to forwarding data packets between the host and the remote device, the OVS is further configured to inspect the packets for security, monitoring, QoS, and automated control of the network traffic. In some embodiments, the OVS is embedded in a hypervisor of the host. In some embodiments, the OVS runs on an external hardware component such as the NIC as part of its firmware.

Although NIC and OVS are used as non-limiting examples of the embedded networking device and the virtual switch, respectively, in the following discussions, a person ordinarily skilled in the art would have understood that the same approach can also be applied to other types of embedded networking devices and virtual switches.

FIG. 1 depicts an example of a diagram of a system 100 configured to support offloading of IPSec operations on network traffic. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a host 102 and a hardware-based, software-programmable NIC 104. Here, the host 102 can be but is not limited to an x86, OCTEON, or ARM based device/system/server. The NIC 104 can be a multi-core embedded hardware module/process engine or a single System-on-Chip (SoC) chip comprising one or more of coprocessors (not shown), a memory (also referred to as primary memory, not shown) such as RAM, and a storage unit (not shown) such as a non-volatile memory (also referred to as secondary memory) with software instructions stored in for practicing one or more processes. Here, the host 102 and the NIC 104 are configured to communicate with each other over a communication interface (not shown) such as a high-speed Peripheral Component Interconnect Express (PCIe) bus attached to the host 102. The PCIe bus is a high-speed serial computer expansion bus designed to support hardware I/O virtualization and to enable maximum system bus throughput, low I/O pin count and small physical footprint for bus devices.

In the example of FIG. 1, the host 102 is configured to run one or more guests/VMs 106, each of which is a software implementation of a physical machine that executes programs to emulate an existing computing environment such as an operating system (OS). The VMs 106 run on top of a hypervisor 110, which presents each VM 106 with a virtual operating platform and manages the execution of each VM 106 on the host 102.

Figure 2:
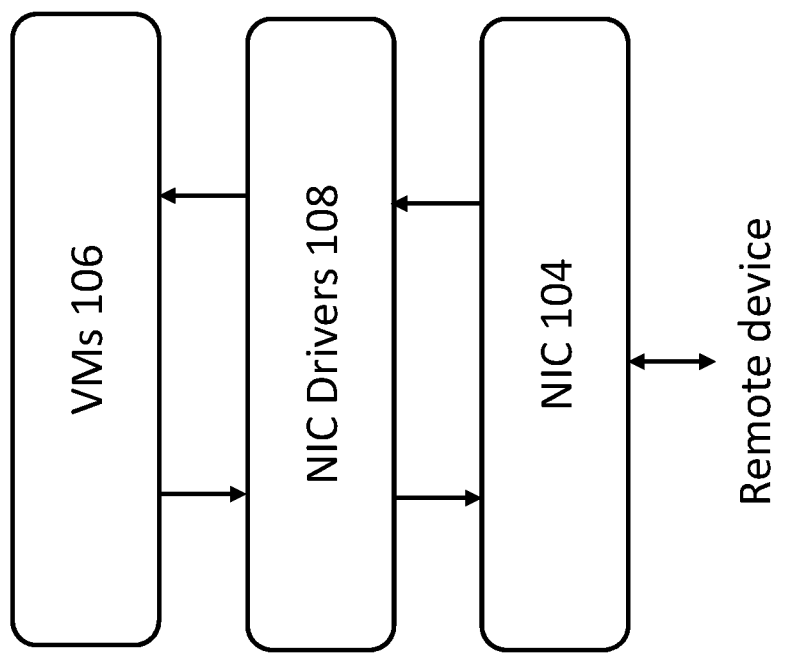
FIG. 2 depicts an example of the flow of data offloaded from the VMs on the host to the NIC through the NIC driver on the host and further forwarded to the remote device following IPSec processing in accordance with some embodiments.

In some embodiments, each of the VMs 106 running on the host 102 has an NIC driver 108 configured to interact with a network interface component 112 of the NIC 104 via the communication interface (e.g., PCIe) between the host 102 and the NIC 104. In some embodiments, each of the NIC driver 108 is a virtual function (VF) driver configured to interact with the PCIe connection of the host 102 and to set up a communication path between its corresponding VM 106 and the network interface component 112 to transmit data packets with the corresponding VM 106. FIG. 2 depicts an example of the flow of data offloaded from the VMs 106 on the host 102 to the NIC 104 through the NIC driver 108 on the host 102 for IPSec processing. In some embodiments, the IPSec-processed data packets are forwarded to the remote device following IPSec processing without returning the packets back to the host before they are transmitted over the network. The data packets received from the remote device over the network are provided back to the VMs 106 after ISPec processing in the reversed order as discussed in details below.

In the example of FIG. 1, the NIC 104 is configured to service/perform IPSec/IKE operations on network packet traffic, wherein such operations are offloaded from the VMs 106 running on the host 102 that requires secured communications with a remote device (not shown) over a network (not shown) following certain communication protocols such as TCP/IP protocol. Here, the network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

As shown by the example of FIG. 1, the NIC 104 has a plurality of software components running on it including but not limited to one or more of network interface component 112 configured to transmit data packets between the VMs 104 and the remote device, IPSec processing component 114 configured to perform the offloaded IPSec operations on the data packets, and virtual switch/OVS component 116 configured to perform switching/routing for the date packets among the VMs 104 as discussed in details below. Each of the components can be a simple executive code that runs on a subset of the available processor cores in the NIC 104. In some embodiments, each of the components can be implemented as a Linux user space application, which runs on a subset of cores of the NIC 104 that run Linux. Note that different components run on independent cores of the NIC 104 and can co-exist with each other, sharing the NIC hardware resources and any software components required for this co-existence.

In some embodiments, NIC 104 and its software components are configured to perform the offloaded IPSec/IKE operations on network packet traffic for all of the secured communications with the VMs 106. The NIC 104, through its network interface component 112, is also configured to support normal network/Ethernet communication with the host 102, allowing the VMs 106 running on the host 102 to use the NIC 104 as a normal Ethernet device by transmitting all network traffic between the host 102 and the remote device over the network with or without IPSec processing.

During operation of the system 100, the VMs 106 running on the host 102 that need to offload its IPSec/IKE operations to the NIC 104 is first identified. In some embodiments, the identified VM 106 is then configured to connect to and offload its IPSec/IKE operations to the NIC 104 by invoking one or more Application Programming Interfaces (APIs) provided by the network interface component 112 the NIC 104. In some embodiments, the syntax of the APIs for offloading the IPSec/IKE operations to the NIC 104 are the same or similar to that of the APIs used for normal network communications with the NIC 104 to ensure that the VMs 106 running on the host 102 can readily use the NIC 104 to offload all of its IPSec/IKE operations with minimal changes to its code.

In some embodiments, the NIC 104 is configured to support at least the following mechanisms for offloading the IPSec operations from the VMs 106:

- Offloading the IPSec operations from the VMs 106 to the IPSec processing component 114 of the NIC 104 without running the OVS component 116 on the NIC 104;
- Offloading the IPSec operations from the VMs 106 to the IPSec processing component 114 of the NIC 104 with the OVS component 116 running on NIC 104;
- Offloading the IPSec operations from the VMs 106 to the NIC 104 with the OVS component 116 tunneling along with the IPSec processing component 114;

Each of the mechanisms is discussed in details below. Here, offloading the IPSec operations means that both SA Kernel and IKE component of the IPSec processing component 114 run in the same environment of the NIC 104. In the case where OVS tunneling is used along with IPSec processing, both the IKE and the OVS tunneling run in the same environment of the NIC 104.

In some embodiments, when the IPSec operations are offloaded from the VMs 106 to the NIC 104 without running the OVS component 116, the NIC 104 is configured to operate in either Transport Mode or Tunnel Mode as discussed in details below.

Under the Transport Mode of operation, the IPSec processing component 114 is configured to offload the IPSec operations from the VMs 104 directly. Specifically, the IPSec processing component 114 is configured to receive data packets directly from the NIC drivers 108 of the VMs 106. If IPSec processing is enabled according to the VF of the NIC drivers 108, the IPSec processing component 114 is configured to parse through and lookup IPSec/SA related policies maintained by the IPSec processing component 114 for further IPSec processing. Once a policy is identified, the received packets are encrypted in transport mode according to the identified IPSec policy and sent out to the remote device by the network interface component 112 on an interface tied or designated by the VF of the NIC drivers 108. On the return path from the remote client device, IPSec-processed packets received by the NIC 104 are decrypted by the IPSec processing component 114 if SA is found for the corresponding Security Parameter Index (SPI) in the packets. The decrypted data packets are then sent to appropriate VMs 106 after a MAC lookup by the network interface component 112. In the case where SA is not found, the received data packets are forwarded to the network interface component 112, which hands over the data packets to the corresponding VMs 106 or broadcasts the data packets to all of the VMs 106.

Under the Tunnel Mode of operation, one of the VMs 106 is configured to server as an IPSec VM to provide IPSec gateway service to a group of VMs 104 and/or to the external devices, wherein the IPSec VM 106 is configured in a gateway mode and acts in a tunnel mode for the other/various VMs 106 running on the host 102. During operation, the IPSec processing component 114 of the NIC 104 is configured to receive data packets from the group of VMs 106 via the NIC driver 108 of the IPSec VM running on the same host 102. The IPSec processing component 114 is then configured to check if IPsec is enabled for the data packets. If so, the IPSec processing component 114 is configured to lookup IPSec policies and once an IPSec policy is found, encrypt the data packets in tunnel mode. Once the data packets have been encrypted, they are sent to the IPSec VM 106 by the network interface component 112 based on the destination MAC. On the return path from the remote device, the IPSec-processed packets received by the NIC 104 in tunnel mode are decrypted if SA is found for the corresponding SPI in the packets. The decrypted tunneled packets are sent to the appropriate VMs 104 via the IPSec VM after a MAC lookup of the decrypted packet by the network interface component 112. In the case SA is not found, the packets are forwarded to the network interface component 112, which hands over the packets to the corresponding IPSec VM 106.

In some embodiments, when the IPSec operations are offloaded from the VMs 106 to the NIC 104 with the OVS component 116, the NIC 104 is also configured to operate in either Transport Mode or Tunnel Mode as discussed in details below.

Under the Transport Mode of operation, the IPSec processing component 114 is configured to offload IPSec the IPSec operations from the VMs 104 directly and its behavior is similar to that for IPSec offloading without OVS discussed above. The difference is that, after the packets have been encrypted, the packets are forwarded to the OVS component 116 for switching instead of being sent out to the remote client device by the network interface component 112. Additionally, on the return path from the remote device, the IPsec-processed packets are handed over to IPSec processing component 114 for decryption from the OVS component 116 (instead of directly from the remote device), which then sends the packets to the corresponding VM 106 following decryption.

Specifically, the IPSec processing component 114 is configured to receive the packets from the NIC drivers 108 of the VMs 106. If IPSec is enabled on the VF of the NIC drivers 108, the IPSec processing component 114 is configured to parse through and lookup IPSec/SA related policies maintained by the IPSec processing component 114 for further IPSec processing. If the IPSec processing component 114 determines that a packet needs confidentiality, encryption and authentication operations are performed according to the identified policies. The encrypted packets are then handed over to the OVS component 116, which is configured to determine where the packets need to be switched/routed to per its routing tables/rules.

On the return path from the remote device, IPSec-processed packets or non-IPSec packets are received by the OVS component 116, which determines where the packets need to be switched to as per its routing tables/rules. If a packet is to be sent to a VM 104 by the OVS component 116, it is first sent to IPSec processing component 114 from the OVS component 116. If the packet is an IPSec packet, it is decrypted if SA is found for the corresponding SPI in the packet. The decrypted packet is then sent to the appropriate VM based on which VM originated the SA. In the case where SA is not found, the packet is forwarded to the network interface component 112, which hands over the packets to the corresponding VMs 106 or broadcasts the packets to all the VMs 106.

Similar to IPSec offloading without OVS discussed above, one IPSec VM 106 is configured under the Tunnel Mode of operation to provide IPSec gateway service to a group of VMs 104 and/or to the external devices, wherein the VM 106 has IPSec configured in a gateway mode and acts in a tunnel mode for the other/various VMs 106. Specifically, the IPSec processing component 114 of the NIC 104 is configured to receive packets from NIC drivers 108 of the group of VMs 106 running on the same host 102 as the IPSec VM 106. The IPSec processing component 114 is then configured to check if IPsec is enabled for the packets. If so, the IPSec processing component 114 is configured to lookup IPSec policies and once a policy is found, encrypt the packets in tunnel mode. After the packets have been encrypted, they are forwarded to the OVS component 116, which then sends the packets based on the its routing table/rules.

On the return path from the remote device, IPSec packets received from the OVS component 116 are decrypted if SA is found for the corresponding SPI in the packets. The decrypted tunneled packets are then sent back to the OVS component 116 as if originating from the IPSec VM 106. In the case where SA is not found, the packets are forwarded to the network interface component 112, which hands over the packets to the corresponding IPSec VM 106.

In some embodiments, the IPSec operations are offloaded from the VMs 106 to the NIC 104 with the OVS component 116 tunneling along with the IPSec processing component 114. In this case, the data packets follow the same path as IPSec offloading with OVS discussed above. The difference here is that tunneled packets from the OVS component 116 may require IPSec processing, which is determined based on a decision table. If it is determined that the packets need IPSec processing, they are sent to the IPSec processing component 114 for further processing. Once the IPSec operations on the packets are done, the decision table is further consulted for the next appropriate action.

In some embodiments, the network interface component 112 of the NIC 104 is configured to transmit standard/normal network traffic from the VMs 104 on the host 102 that does not require IPSec processing to the remote device over the network unmodified or minimally processed wherein the NIC 104 is used as a network adapter by the host 102. The same applies to traffic received from the remote device over the network and forwarded to the VMs 104 on the host 102. For data packets that require secured communication, the network interface component 112 of the NIC 104 is configured to manage both establishments and terminations of the connections for the secured communication between the VMs 104 and the remote device and to pass appropriate information to the host 102. The network interface component 112 is configured to receive data packets from the VMs 104 on the host 102, wherein connection information may also be sent along to the NIC 104 with these packets. The network interface component 112 is configured to send these packets to an underlying network (e.g., TCP/IP) connection, which eventually sends the packets out to the remote client over the network following necessary IPSec processing. The network interface component 112 is also configured to receive encrypted packets from the remote device over the network and provide the packets to the VMs 104 with the appropriate connection identification information after the packets have been decrypted.

Figure 3:
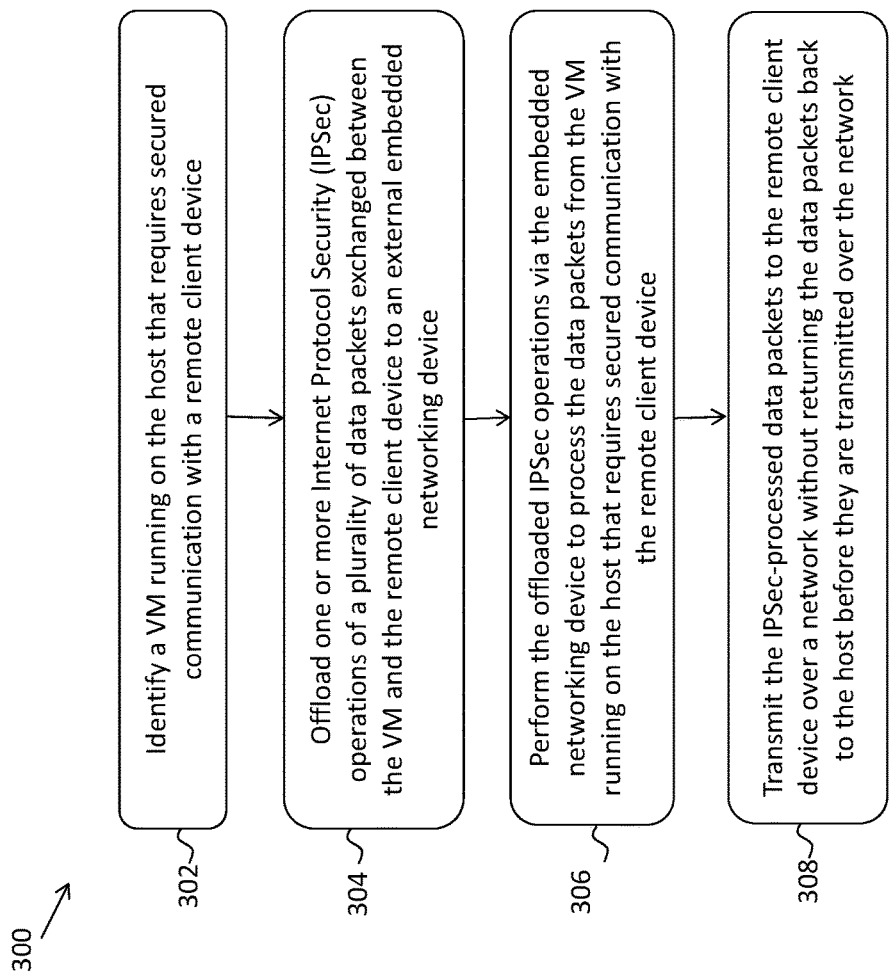
FIG. 3 depicts a flowchart of an example of a process to support offloading of offloading of IPSec operations on network traffic in accordance with some embodiments.

FIG. 3 depicts a flowchart of an example of a process to support offloading of offloading of IPSec operations on network traffic. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a virtual machine (VM) running on a host that requires secured communication with a remote client device is identified. The flowchart 300 continues to block 304, where one or more Internet Protocol Security (IPSec) operations of a plurality of data packets exchanged between the VM and the remote client device are offloaded to an external embedded networking device such as an NIC. The flowchart 300 continues to block 306, where the offloaded IPSec operations are performed by the embedded networking device to process the data packets from the VM running on the host that requires secured communication with the remote client device. The flowchart 300 ends at block 308, where the IPSec-processed data packets are transmitted to the remote client device over a network without returning the data packets back to the host before they are transmitted over the network.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support offloading of IPSec operations on network traffic comprising:
    a host running one or more virtual machines (VMs) and configured to:
        identify a VM running on the host that requires secured communication with a remote client device;
        offload one or more Internet Protocol Security (IPSec) operations of a plurality of data packets exchanged between the VM and the remote client device to an external embedded networking device, wherein the embedded networking device is a hardware-based, software-programmable Network Interface Card (NIC), wherein the NIC is a multi-core network packet processing engine and the NIC includes a IPSec processing component, a network interface component, and a virtual switch component, each component running on independent cores of the multi-core network, and wherein the NIC is configured to:
        encrypt the data packets in a tunnel mode if an IPSec policy is found;
        send the encrypted data packets to a IPSec VM based on a destination Media Access Control (MAC);
        decrypt IPSec-processed packets received by the NIC on a return path from the remote client device if a security association (SA) is found for a corresponding Security Parameter Index (SPI) in the IPSec-processed packets;
        send the decrypted packets to the VMs via the IPSec VM after a MAC lookup of the decrypted packets;
        perform the offloaded IPSec operations to process the data packets from the VM running on the host that requires secured communication with the remote client device;
        support flexible packet processing at various input/output rates; and
        transmit the IPSec-processed data packets to the remote client device over a network without returning the data packets back to the host before they are transmitted over the network.

2. The system of claim 1, wherein:
the host is one of an x86 and ARM based devices.

3. The system of claim 1, wherein:
the host and the embedded networking device are configured to communicate with each other over a Peripheral Component Interconnect (PCI) bus.

4. The system of claim 1, wherein:
the host is configured to enable an application to offload its Secure Sockets Layer (SSL) processing to the embedded networking device by invoking one or more Application Programming Interface (API) having same syntax as that of the APIs used for network communications with the embedded networking device.

5. The system of claim 1, wherein:
the VM running on the host further comprises an NIC driver configured to interact with the NIC, wherein the NIC driver is a virtual function (VF) driver configured to set up a communication path between its corresponding VM and the NIC to transmit data packets.

6. The system of claim 5, wherein:
the NIC is configured to operate in a transport mode wherein the NIC is configured to
  receive the data packets from the NIC driver of the VM directly;
  identify one or more IPSec related policies maintained by the embedded networking device for IPSec processing if such IPSec processing is enabled according to the VF of the NIC driver;
  encrypt the received data packets according to the identified IPSec policies if such policies are identified;
  send the encrypted data packets to the remote client device.

7. The system of claim 6, wherein:
the NIC is configured to
  decrypt IPSec-processed packets received by the NIC on a return path from the remote client device if a security association (SA) is found for a corresponding Security Parameter Index (SPI) in the packets;
  send the decrypted data packets to the VM after a Media Access Control (MAC) lookup by the embedded networking device.

8. The system of claim 7 wherein:
the NIC is configured to forward the received data packets to the corresponding VM or broadcast the packets to all of the VMs if SA is not found.

9. The system of claim 1, wherein:
the NIC is configured to operate in a tunnel mode wherein one of the VMs is configured to serve as an IPSec VM to provide IPSec gateway service to a group of VMs, wherein the IPSec VM is configured in a gateway mode and acts in a tunnel mode for the other VMs running on the host.

10. The system of claim 9, wherein:
the NIC is configured to:
  receive the data packets from the group of VMs via a NIC driver of the IPSec VM running on the same host; and
  lookup IPSec policies if IPSec is enabled for the data packets.

11. The system of claim 1, wherein:
the embedded networking device is configured to perform switching/routing for the data packets of the VMs via the virtual switch, which determines where the data packets need to be switched/routed to per its routing tables/rules.

12. The system of claim 11, wherein:
the embedded networking device is configured to
  process the received data packets with the IPSec operations according to an IPSec policy if such policy identified;
  forward the data packets to the virtual switch instead of sending them out to the remote client device directly after the data packets have been processed with the IPSec operations.

13. The system of claim 12, wherein:
the embedded networking device is configured to
  receive IPSec-processed packets by the virtual switch, which determines where the packets need to be switched to as per its routing tables/rules;
  decrypt the IPSec-processed packets if a security association (SA) is found for the corresponding Security Parameter Index (SPI) in the packets;
  forward the decrypted packets to the appropriate VM based on which VM originated the SA.

14. The system of claim 1, wherein:
the embedded networking device is configured to manage both establishment and termination of connections for the secured communication between the VMs and the remote device and to pass appropriate information to the host.

15. The system of claim 1, wherein:
the embedded networking device is configured to transmit standard network traffic from the VMs on the host that does not require IPSec processing to the remote device over the network unmodified or minimally processed.

16. A method to support offloading of IPSec operations on network traffic, comprising:
identifying a VM running on a host that requires secured communication with a remote client device;
offloading one or more Internet Protocol Security (IPSec) operations of a plurality of data packets exchanged between the VM and the remote client device to an external embedded networking device, wherein the embedded networking device is a hardware-based, software-programmable Network Interface Card (NIC), wherein the NIC is a multi-core network packet processing engine and the NIC includes a IPSec processing component, a network interface component, and a virtual switch component, each component running on independent cores of the multi-core network, and wherein the NIC is configured to:
encrypt the data packets in a tunnel mode if an IPSec policy is found;
send the encrypted data packets to a IPSec VM based on a destination Media Access Control (MAC);
decrypt IPSec-processed packets received by the NIC on a return path from the remote client device if a security association (SA) is found for a corresponding Security Parameter Index (SPI) in the IPSec-processed packets;
send the decrypted packets to the VMs via the IPSec VM after a MAC lookup of the decrypted packets;
perform the offloaded IPSec operations to process the data packets from the VM running on the host that requires secured communication with the remote client device;
support flexible packet processing at various input/output rates; and
transmit the IPSec-processed data packets to the remote client device over a network without returning the data packets back to the host before they are transmitted over the network.

17. The method of claim 16, wherein:
the VM running on the host further comprises an NIC driver configured to interact with the NIC, wherein the NIC driver is a virtual function (VF) driver configured to set up a communication path between its corresponding VM and the NIC to transmit data packets.

18. The method of claim 17, further comprising:
receiving the data packets from the NIC driver of the VM directly in a transport mode;
identifying one or more IPSec related policies maintained by the embedded networking device for IPSec processing if such IPSec processing is enabled according to the VF of the NIC driver;
encrypting the received data packets according to the identified IPSec policies if such policies are identified;
sending the encrypted data packets to the remote client device.

19. The method of claim 18, further comprising:
decrypting IPSec-processed packets received by the NIC on a return path from the remote client device if a security association (SA) is found for the corresponding Security Parameter Index (SPI) in the packets;
sending the decrypted data packets to the VM after a Media Access Control (MAC) lookup by the embedded networking device.

20. The method of claim 19, further comprising:
forwarding the received data packets to the corresponding VM or broadcast the packets to all of the VMs if SA is not found.

21. The method of claim 16, further comprising:
operating the NIC in a tunnel mode, wherein one of the VMs is configured to serve as an IPSec VM to provide IPSec gateway service to a group of VMs, wherein the IPSec VM is configured in a gateway mode and acts in a tunnel mode for the other VMs running on the host.

22. The method of claim 21, further comprising:
receiving the data packets from the group of VMs via a NIC driver of the IPSec VM running on the same host; and
looking up IPSec policies if IPSec is enabled for the data packets.

23. The method of claim 16, further comprising:
performing switching/routing for the data packets of the VMs via the virtual switch, which determines where the data packets need to be switched/routed to per its routing tables/rules.

24. The method of claim 23, further comprising:
processing the received data packets with the IPSec operations according to an IPSec policy if such policy identified;
forwarding the data packets to the virtual switch instead of sending them out to the remote client device directly after the data packets have been processed with the IPSec operations.

25. The method of claim 24, further comprising:
receiving IPSec-processed packets by the virtual switch, which determines where the packets need to be switched to as per its routing tables/rules;
decrypting the IPSec-processed packets if a security association (SA) is found for the corresponding Security Parameter Index (SPI) in the packets;
forwarding the decrypted packets to the appropriate VM based on which VM originated the SA.

26. The method of claim 16, further comprising:
managing both establishment and termination of connections for the secured communication between the VMs and the remote device and to pass appropriate information to the host.

27. The method of claim 16, further comprising:
transmitting standard network traffic from the VMs on the host that does not require IPSec processing to the remote device over the network unmodified or minimally processed.

* * * * *

UNITED STATES PATENT AND TRADEMARK OFFICE
CERTIFICATE OF CORRECTION

PATENT NO. : 10,250,571 B2
APPLICATION NO. : 15/246440
DATED : April 2, 2019
INVENTOR(S) : Ram Kumar Manapragada et al.

Page 1 of 1

It is certified that error appears in the above-identified patent and that said Letters Patent is hereby corrected as shown below:

In the Claims

In Claim 6, Column 9, Line 22, please insert a --:-- after "configured to";
In Claim 7, Column 9, Line 35, please insert a --:-- after "configured to";
In Claim 12, Column 10, Line 2, please insert a --:-- after "configured to"; and
In Claim 13, Column 10, Line 11, please insert a --:-- after "configured to".

Signed and Sealed this
Twenty-first Day of May, 2019

Andrei Iancu
*Director of the United States Patent and Trademark Office*